(12) United States Patent
Perlin et al.

(10) Patent No.: US 12,000,295 B2
(45) Date of Patent: Jun. 4, 2024

(54) COMPOSITE TURBOMACHINE VANE AND METHOD FOR MANUFACTURING SAME

(71) Applicant: SAFRAN AIRCRAFT ENGINES, Paris (FR)

(72) Inventors: Matthieu Patrick Jean Roger Perlin, Moissy-Cramayel (FR); Nicolas François Paul Broussais-Colella, Moissy-Cramayel (FR); Damien Vincent Le Cloarec, Moissy-Cramayel (FR); Ambroise Nicolas Marie Malfroy, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/907,573

(22) PCT Filed: Apr. 1, 2021

(86) PCT No.: PCT/FR2021/050576
§ 371 (c)(1),
(2) Date: Sep. 28, 2022

(87) PCT Pub. No.: WO2021/198621
PCT Pub. Date: Oct. 7, 2021

(65) Prior Publication Data
US 2023/0142441 A1 May 11, 2023

(30) Foreign Application Priority Data
Apr. 2, 2020 (FR) ........................................ 2003301

(51) Int. Cl.
*F01D 25/00* (2006.01)
*B29C 70/68* (2006.01)
(Continued)

(52) U.S. Cl.
CPC ............ *F01D 25/005* (2013.01); *B29C 70/68* (2013.01); *F01D 9/02* (2013.01); *B29L 2031/08* (2013.01);
(Continued)

(58) Field of Classification Search
CPC ........ F01D 5/282; F01D 5/286; F01D 5/3092; F05D 2300/432; F05D 2300/603; F05D 2300/702; B29L 2031/08
See application file for complete search history.

(56) References Cited

U.S. PATENT DOCUMENTS 5,573,377 A * 11/1996 Bond ...................... F01D 5/147
416/229 A
5,935,360 A 8/1999 Griggs
(Continued)

FOREIGN PATENT DOCUMENTS

FR 3 049 305 A1 9/2017
WO 2015/057369 A1 4/2015

OTHER PUBLICATIONS

English translation of Written Opinion mailed Jul. 5, 2021, issued in corresponding International Application No. PCT/FR2021/050576, filed Apr. 1, 2021, 4 pages.
(Continued)

*Primary Examiner* — Courtney D Heinle
*Assistant Examiner* — Danielle M. Christensen
(74) *Attorney, Agent, or Firm* — CHRISTENSEN O'CONNOR JOHNSON KINDNESS PLLC

(57) ABSTRACT

A turbomachine blade is made of composite material formed of woven fibers and embedded in a polymerised resin. The blade includes a root connected by a stilt to a vane which comprises a pressure side and a suction side. At least one anti-wear strip of fabric is located on a surface of the root
(Continued)

and/or the stilt. At least one anti-wear strip is secured to the root surface in a unitary manner by the resin.

7 Claims, 2 Drawing Sheets

(51) Int. Cl.
*F01D 9/02* (2006.01)
*B29L 31/08* (2006.01)

(52) U.S. Cl.
CPC .... *F05D 2220/323* (2013.01); *F05D 2230/20* (2013.01); *F05D 2240/12* (2013.01); *F05D 2300/603* (2013.01)

(56) References Cited

U.S. PATENT DOCUMENTS

| | | | |
|---|---|---|---|
| 10,487,670 B2 * | 11/2019 | Thomas | B32B 37/18 |
| 11,014,857 B2 * | 5/2021 | Weaver | C04B 35/645 |
| 11,371,364 B2 * | 6/2022 | Le Meur | D03D 15/267 |
| 2015/0110636 A1 | 4/2015 | Abraham et al. | |
| 2023/0078542 A1 * | 3/2023 | Rowlands | F01D 5/3007 |

OTHER PUBLICATIONS

International Preliminary Report on Patentability mailed Sep. 29, 2022, issued in corresponding International Application No. PCT/FR2021/050576, filed Apr. 1, 2021, 6 pages.

International Search Report mailed Jul. 5, 2021, issued in corresponding International Application No. PCT/FR2021/050576, filed Apr. 1, 2021, 5 pages.

Written Opinion mailed Jul. 5, 2021, issued in corresponding International Application No. PCT/FR2021/050576, filed Apr. 1, 2021, 5 pages.

* cited by examiner

COMPOSITE TURBOMACHINE VANE AND METHOD FOR MANUFACTURING SAME

FIELD OF THE DISCLOSURE

The present disclosure relates to a composite turbomachine vane and its manufacturing method.

BACKGROUND

The technical background comprises in particular the documents US-A1-2015/110 636, US-A1-5 935 360, WO-A1-2015/057 369A1 and FR-A1-3 049 305.

The use of composite materials is particularly advantageous in the aeronautical industry because these materials are relatively light and have good mechanical properties.

A composite material typically used in aeronautic comprises a fibrous preform embedded in a polymeric resin. The preform may be a three-dimensional weaving or may be obtained by draping and superimposing several fabrics.

The resin can be injected into the preform or the preform can be pre-impregnated with the resin.

The shaping of the final part is usually carried out by means of a tooling comprising a mold. In the case where a resin is to be injected into a preform, the preform is arranged in the cavity of a mold and the mold is covered with a counter-mold. The tooling comprises a port for injecting resin into the mold cavity and a port for evacuating the cavity of the mold.

In the case where the preform is already impregnated with the resin, the preform is arranged in the cavity of a mold which can be covered with a flexible tarpaulin or a counter-mold.

The tooling also comprises a port for injecting resin into the cavity of the mold and a port for vacuuming the cavity of the mold. The counter-mold applies a pressure to the preform due to the vacuuming of the preform located between the counter-mold and the flexible tarpaulin or the mold. The use of a counter-mold allows to better control the thickness of the final part.

In the case of a vane, in particular for a fan, after the molding operation described above, an operation to apply anti-wear strips to the root and the stilt of the vane must be carried out.

These strips are currently fitted and secured to the root and the stilt of the vane by gluing. Thus, the anti-wear strips are first impregnated with glue, usually phenolic, by hand. The operator then places the anti-wear strips on the root and the stilt of the vane, still manually.

The vane covered with the anti-wear strips is then placed back into the mold and the wear strips are vacuum glued using a silicone counter-mold.

This operation of gluing the anti-wear strips is therefore very manual and generates many defects in the final part. In service, the anti-wear strips have been found to be detached, exposing the composite of the vane and making it unusable.

These detachments are mainly due to a poor gluing rate of the anti-wear strips. However, the correct gluing rate requires weighing the amount of glue to the nearest tenth of a gram and is virtually impossible to achieve when done manually.

In addition, the way in which the glue is distributed on the anti-wear strips has a direct influence on the quality of the gluing: even the smallest area that is poorly impregnated leads to a poor gluing.

The amount of glue also generates dimensional non-conformities: the amount of glue directly influences the final thickness of the anti-wear strips on the vane.

Thus, if the strips are over-impregnated or the glue is poorly distributed, the differences in flatness and the dimensions, in particular at the root of the vane, go out of tolerance and the vane becomes non-conforming.

The anti-wear strips are provided dry with variations in thickness that do not allow the quantity of glue to be standardised: a good gluing for a thinner anti-wear strip requires a smaller quantity of adhesive than for a thicker anti-wear strip.

Furthermore, as we have seen, the anti-wear strips are vacuum glued using a silicone counter-mold which, not fitting perfectly to certain geometries of the fan vane, generates accumulations of glue at certain points.

These glue accumulations in turn lead to thicknesses and dimensional non-conformities of the fan vane.

Another difficulty encountered with the current method for gluing the anti-wear strips to the vane is the difficulty of positioning the strips, to within several tens of millimetres, by hand on a left-hand form and the difficulty of maintaining this positioning of the strips during the operation of installing the vane coated with anti-wear strips in the mold and during the vacuum gluing operation.

In addition, once glued, the anti-wear strips serve as a dimensional reference for the vane. Thus, different gluing qualities can lead to problems in service or negatively impact the final geometry of the part.

The present disclosure relates to the aforementioned technology for manufacturing a composite vane on a surface of which at least one fabric anti-wear strip is to be secured, with a precise positioning and precise dimensions to be respected.

The present disclosure proposes an improvement to this technology, which is simple, effective and economical.

SUMMARY

The disclosure relates to a turbomachine vane, this vane being made of composite material formed of fibres woven and embedded in a polymerised resin, this vane comprising a root connected by a stilt to a blade which comprises a pressure side and a suction side, at least one anti-wear strip of fabric being located on a surface of the root and/or of the stilt, characterised in that the at least one anti-wear strip is secured to the surface of the root in a unitary manner by the resin.

In particular, the disclosure allows the anti-wear strip or the anti-wear strips to be precisely positioned on the vane. In addition, it allows the strip or the strips to be secured to the vane without the use of glue, as the resin used to manufacture the blade is used to carry out this securing.

The vane according to the disclosure may comprise one or more of the following characteristics, taken alone or in combination with each other:
  the vane comprises at least one, and preferably two, anti-wear strips on a first surface of the root and/or of the stilt located on the side of the pressure side, and at least one, and preferably two, anti-wear strips on a second surface of the root and/or of the stilt located on the side of the suction side;
  the at least one anti-wear strip has an elongated shape and extends substantially from one end of the root located on the side of a leading edge of the blade, to an opposite end of the root located on the side of a trailing edge of the blade;

the at least one strip is formed by weaving PTFE and/or aramid fibres;

the at least one strip has a thickness that varies along its length.

The present disclosure also relates to a method for manufacturing a vane as described above, using a tooling comprising a mold defining a cavity configured to receive a woven fibre preform, the method comprising the following steps:

a) positioning the at least one anti-wear strip on at least one wall of the mold opening into the cavity, b) installing the preform in the cavity and on the wall, and c) polymerising the resin present on the fibres of the preform or injected into the cavity, this resin being configured to solidify the vane and ensure the securing of the at least one anti-wear strip to this vane.

In step a), the at least one anti-wear strip is preferably positioned in a recess formed in the wall.

In step c), the resin is advantageously configured to soak the at least one anti-wear strip.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
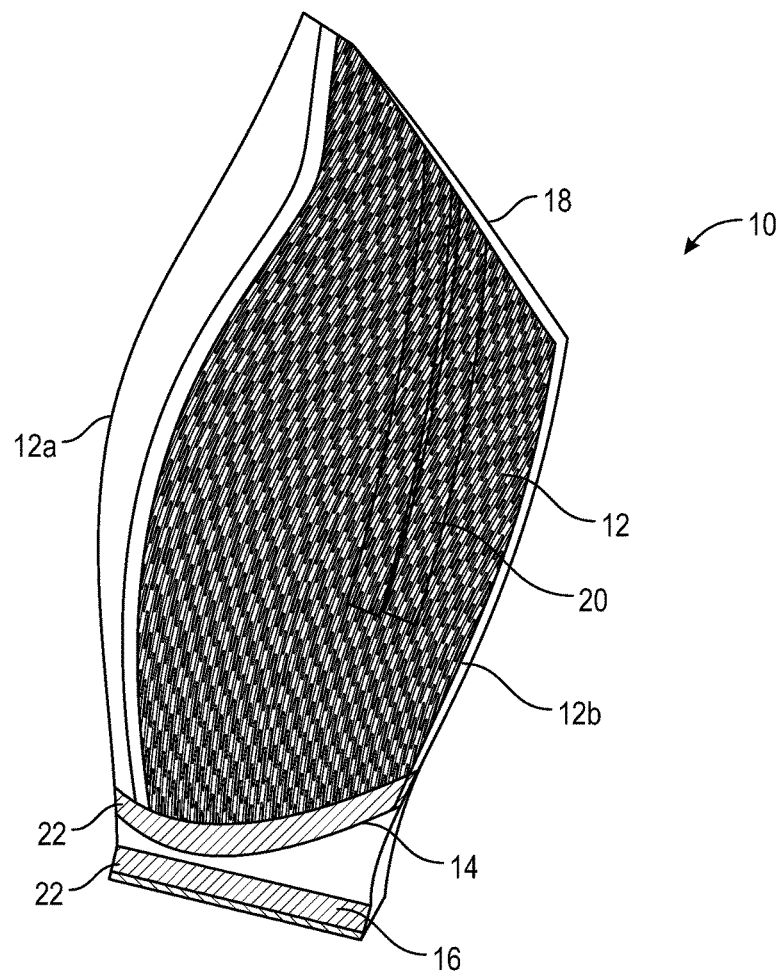
FIG. 1 is a schematic perspective view of a composite vane according to the disclosure.
Figure 2:
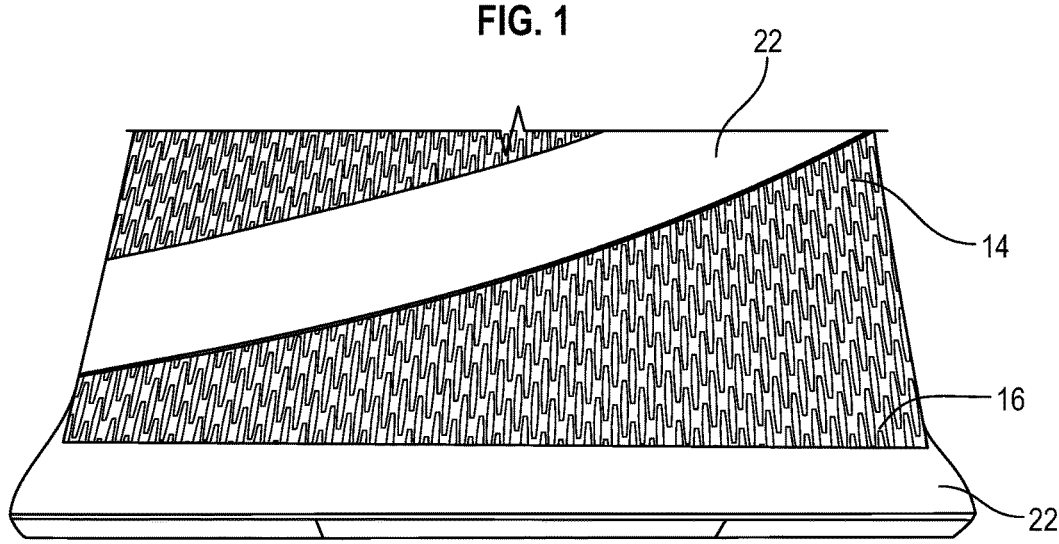
FIG. 2 is a larger scale schematic view of a portion of the vane of FIG. 1, and in particular its root and its stilt on which are located anti-wear strips.

Reference is made firstly to FIGS. 1 and 2 which illustrate a composite material vane 10 for a turbomachine, this vane 10 being for example a fan vane.

The vane 10 comprises a blade 12 connected by a stilt 14 to a root 16 which has, for example, a dovetail shape and is shaped to be engaged in a complementarily shaped pocket of a rotor disc, in order to retain the vane on this disc.

The blade 12 comprises a leading edge 12a and a trailing edge 12b of the gases flowing through the turbomachine. The blade 12 has a curved or twisted aerodynamic profile and comprises a pressure side 18 and a suction side 20 extending between the leading 12a and trailing 12b edges.

Anti-wear strips 22 made of fabric are secured to the vane 10.

In the example shown, the vane 10 comprises four anti-wear strips 22, two on each side of the root 16 and two others on each side of the stilt 14.

As the name suggests, the strips 22 are configured to limit the wear on the walls to which they are attached, by contact and/or friction. These strips 22 are located on the root 16 and the stilt 14 which are likely to come into contact with bearing surfaces of the aforementioned rotor disc.

Each strip 22 is generally elongate in shape and extends substantially from the leading edge 12a to the trailing edge 12b of the vane 12. A strip 22 has for example a length of between 2 and 50 cm, and a width of between 2 and 7 cm.

An anti-wear strip 22 is carried out by weaving fibres such as aramid fibres and/or PTFE.

The vane 10 is made of composite material from a fibrous preform whose fibres, for example of carbon, are coated or impregnated with polymerisable and in particular cross-linkable resin (such as an epoxy resin).

The tooling used to manufacture the vane 10 comprises a mold and a counter-mold, the mold and the counter-mold defining between them a cavity configured to receive the fibrous preform When manufacturing a vane, the tooling is opened and a fibrous preform is arranged into the cavity. This arrangement can be made with a three-dimensional woven preform or with fabrics that are draped and superimposed in the cavity. This step can be done manually or by means of a robot. The tooling is then closed by attaching in a sealing manner the counter-mold to the mold.

The preform is pre-impregnated with resin or the resin is injected into the mold to impregnate the preform.

The tooling is heated to raise the temperature of the resin and cause it to polymerized.

After the resin has polymerized and the vane has stiffened, the strips 22 are glued to the vane, for example with a phenolic adhesive, in the prior art.

This gluing operation is, at present, an entirely manual operation which comprises three steps, a step of coating the strips with the glue, a step of positioning the strips, and a step of holding the strips in position until the glue sets.

This manual operation is the source of many defects in the final part, as seen above.

The present disclosure proposes to eliminate the manual gluing operation and to carry out the assembly of the strips 22 at the same time as the polymerizing operation of the resin and the stiffening operation of the vane.

Figure 3:
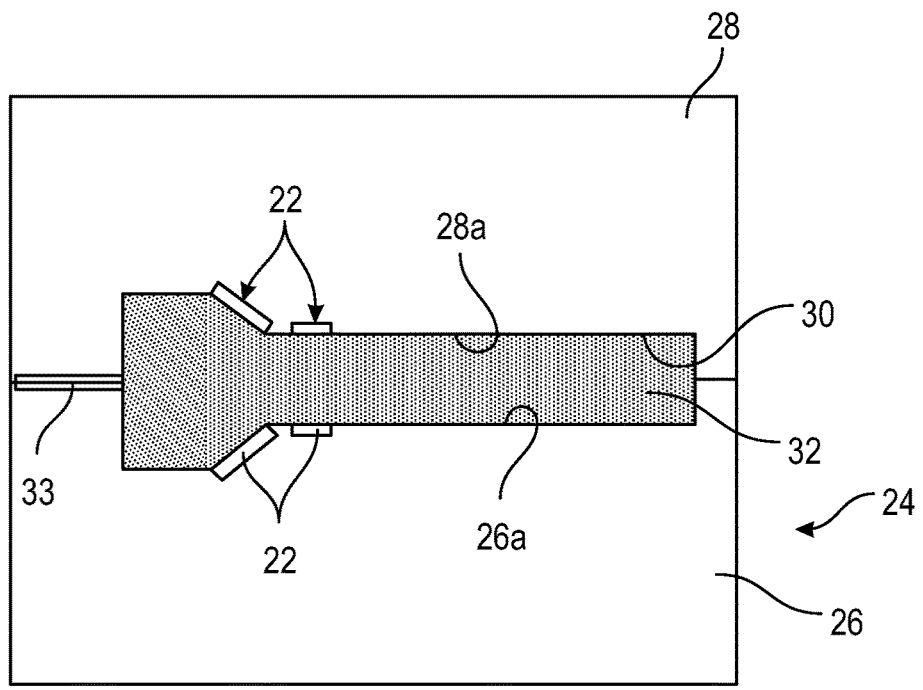
FIG. 3 is a very schematic cross-sectional view of a tooling for manufacturing a vane according to the disclosure.
Figure 4:
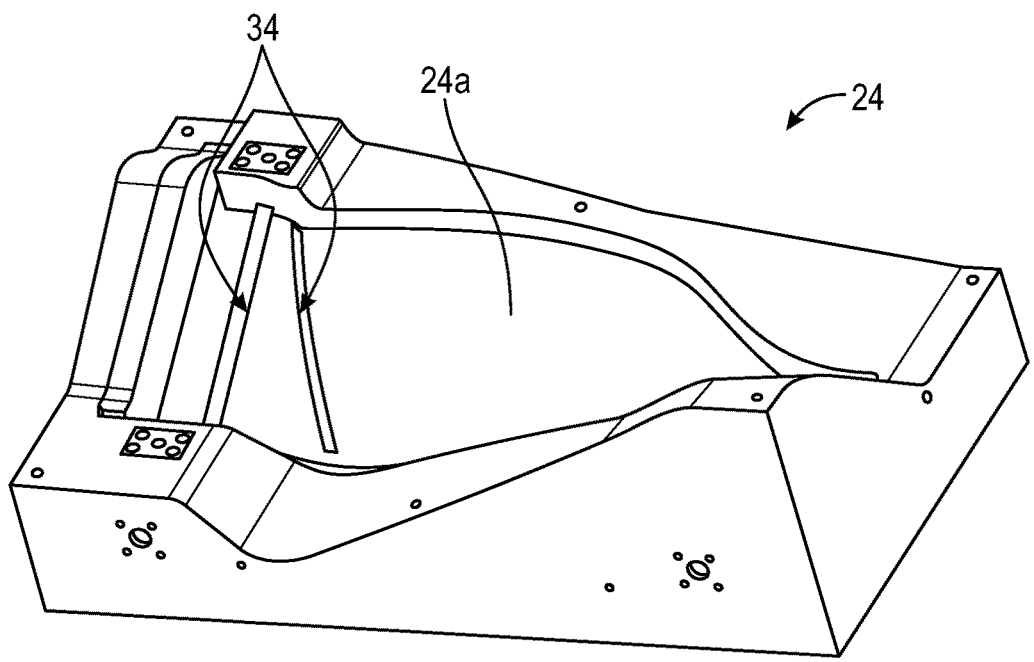
FIG. 4 is a schematic perspective view of an embodiment of a mold of a tooling for manufacturing a vane according to the disclosure.

The manufacturing method of the vane according to the disclosure thus allows to do away with the manual gluing operation of the prior art, which allows to solve the problem of obtaining non-conforming parts and, moreover, to have a simpler method than that currently used Indeed, the method of the disclosure comprises, as in the prior art method, the use of a tooling 24 comprising a mold 26 and a counter-mold 28, the mold 26 and the counter-mold 28 defining between them a cavity 30 configured to receive the fibrous preform 32 of the vane (FIG. 3).

However, in the method of the disclosure, before installing the fibrous preform 32 in the mold, the strip or the strips 22 of fabric are placed on at least one wall 26a, 28a of the mold 26 or of the counter-mold 28, which opens into the cavity 30.

The fibrous preform 32 is then installed between the mold 26 and the counter-mold 28.

As mentioned above, the preform is pre-impregnated with resin, or resin is injected through a port 33 in the mold to impregnate the preform. The injection of resin into the cavity of the tooling allows to exert a pressure on the preform and to prevent air bubbles and microporosities from appearing in the final part. The resin is then polymerized.

In the method of the disclosure, two types of resin are no longer used, the resin impregnating the fibres of the preform and a resin or glue for gluing the strips, but only the resin, for example epoxy.

The defects due to the wrong amount of glue, an extra thickness or a lack of glue between the strip 22 and the vane are therefore avoided.

In addition, a unitary part is obtained.

In order to achieve precision to within a few millimetres in the positioning and holding of the strips 22, which was also a source of defects in the prior art method, the mold 26 advantageously comprises housings 34 provided to receive the strips 22.

These housings 34 may be recesses or cut-outs formed in the wall 26a, 28a opening into the cavity 30. They are advantageously calibrated to the nominal thickness of the strips 22, which is for example between 0.1 and 1.5 mm.

The disclosure thus provides several advantages, including:
- the securing of the strips by means of the resin rather than dedicated glue, during the solidification of the vane, allows for a perfect geometry and a precise placement of the strips;
- the variable thicknesses of the strips no longer have any impact since they are pressed against the walls of the tooling and received in calibrated housings in these walls;
- the amount of resin is optimal at any point on the strips, driven by the injection pressure in the tooling and/or by the closing pressure of the mold; etc.

The invention claimed is:

1. A turbomachine vane, comprising a composite material formed of carbon fibers woven in three-dimensions and embedded in a first resin, the vane comprising a root connected by a stilt to a blade which comprises a pressure side and a suction side, at least one anti-wear strip of fabric being located on a surface of the root and/or the stilt, wherein the at least one anti-wear strip is secured in a unitary manner to the surface of the root by a second resin and is produced by weaving PTFE and/or aramid fibers, wherein both first and second resins are the same and are cured simultaneously.

2. The turbomachine vane according to claim 1, wherein said at least one anti-wear strip comprises a first anti-wear strip on a first surface of the root and/or the stilt located on a side of said pressure side, and a second anti-wear strip on a second surface of the root and/or the stilt located on a side of said suction side.

3. The turbomachine vane according to claim 1, wherein the at least one anti-wear strip is elongate in shape and extends from one end of the root located on a side of a leading edge of the blade to an opposite end of the root located on a side of a trailing edge of the blade.

4. The turbomachine vane according to claim 1, wherein the at least one strip has a thickness that varies along its length.

5. A method for manufacturing the turbomachine vane according to claim 1 using a tooling comprising a mold defining a cavity configured to receive a preform of woven fibers, the method comprising the steps of:
a) positioning the at least one anti-wear strip on at least one wall of the mold opening into the cavity,
b) installing the preform in the cavity and on said wall, and
c) curing the resin present on the fibers of the preform or injected into the cavity, the resin being configured to solidify the vane and ensure the securing of the at least one anti-wear strip to this vane.

6. The method according to claim 5, wherein in step a) the at least one anti-wear strip is positioned in a recess formed in said wall.

7. The method of claim 5, wherein in step c) the resin is configured to soak the at least one anti-wear strip.

* * * * *